US012357529B2

(12) United States Patent
Bolton

(10) Patent No.: US 12,357,529 B2
(45) Date of Patent: Jul. 15, 2025

(54) ADJUSTABLE STIMULATION DEVICE

(71) Applicant: Starella Bolton, Katy, TX (US)

(72) Inventor: Starella Bolton, Katy, TX (US)

( * ) Notice: Subject to any disclaimer, the term of this patent is extended or adjusted under 35 U.S.C. 154(b) by 929 days.

(21) Appl. No.: 17/202,949

(22) Filed: Mar. 16, 2021

(65) Prior Publication Data

US 2021/0283006 A1 Sep. 16, 2021

Related U.S. Application Data

(60) Provisional application No. 62/990,242, filed on Mar. 16, 2020.

(51) Int. Cl.
*A61H 19/00* (2006.01)

(52) U.S. Cl.
CPC ..... *A61H 19/44* (2013.01); *A61H 2201/0153* (2013.01); *A61H 2201/1685* (2013.01)

(58) Field of Classification Search
CPC ........ A61H 19/44; A61H 19/40; A61H 19/00; A61H 2201/0192; A61H 19/50; A61H 19/32; A61H 19/34; A61H 19/30
USPC ........ 600/38
See application file for complete search history.

(56) References Cited

U.S. PATENT DOCUMENTS 5,690,604 A * 11/1997 Barnett .................. A61H 19/44 600/38
6,758,826 B2 * 7/2004 Luettgen ............ A61H 23/0254 601/72
6,899,671 B1 * 5/2005 Fontenot ................ A61H 19/44 600/38
6,991,599 B2 1/2006 Hudson
7,077,817 B2 * 7/2006 Young ................ A61H 23/0254 601/135
7,452,326 B2 11/2008 Fladl et al.
7,513,868 B1 * 4/2009 Fontenot ................ A61H 19/44 600/38
7,803,126 B2 * 9/2010 Nan ....................... A61H 19/34 600/38
8,313,424 B2 11/2012 Gabrielidis
D743,043 S * 11/2015 Cao et al. .................... D24/215
D767,157 S * 9/2016 Yu ................................ D24/215
2004/0193080 A1 9/2004 Siddhartha
(Continued)

FOREIGN PATENT DOCUMENTS

CN 106619020 A * 5/2017

*Primary Examiner* — Samuel G Gilbert
(74) *Attorney, Agent, or Firm* — Boudwin Intellectual Property Law, LLC; Daniel Boudwin

(57) ABSTRACT

An adjustable stimulation device includes a telescopically adjustable support arm having a handle affixed to a first end thereof. A first end of a connector is removably secured to a second end of the telescopically adjustable support arm. A flexible gooseneck support is removably secured to a second end of the connector. A stimulation toy is removably secured to a second end of the flexible gooseneck support. The flexible gooseneck support is configured to be adjustable and maintain a position to which it is bent in order to support the stimulation toy at a desired angle and position. The stimulation toy can be motorized or nonmotorized. For motorized stimulation toys, the handle can include a power source, a wireless transceiver, and control buttons for wirelessly controlling a motor within the stimulation toy, the stimulation toy including a corresponding wireless transceiver and internal power source.

4 Claims, 4 Drawing Sheets

(56) References Cited

U.S. PATENT DOCUMENTS

| | | | | |
|---|---|---|---|---|
| 2006/0070206 | A1* | 4/2006 | Fischer | A47L 5/32<br>15/334 |
| 2011/0034763 | A1* | 2/2011 | Domnick | A61H 19/44<br>600/38 |
| 2013/0110017 | A1 | 5/2013 | Imboden et al. | |
| 2014/0088469 | A1* | 3/2014 | Wise | A61N 1/0512<br>601/46 |
| 2014/0171842 | A1* | 6/2014 | Conner | A61H 23/0263<br>601/46 |
| 2019/0060162 | A1* | 2/2019 | Martin | A61H 19/34 |
| 2019/0365599 | A1* | 12/2019 | Fallas | A61H 1/00 |

* cited by examiner

ADJUSTABLE STIMULATION DEVICE

CROSS REFERENCE TO RELATED APPLICATIONS

This application claims the benefit of U.S. Provisional Application No. 62/990,242 filed on Mar. 16, 2020. The above identified patent application is herein incorporated by reference in its entirety to provide continuity of disclosure.

BACKGROUND OF THE INVENTION

The present invention relates to stimulation devices. More specifically, the present invention provides an adjustable stimulation device with a telescoping handle and a gooseneck support for positioning an attached stimulation toy at a desired angle and position. Some embodiments of the present invention include controls in the handle that control movement of the stimulation toy.

Sexual stimulation toys are commonplace and used by many individuals. Different varieties of sexual stimulation toys and accessories related thereto are available. These range from simple unpowered implements to more complex motorized toys with many different components. Some stimulation toys include handle-like elements that make them easier to grasp and hold. However, these elements are limited to the singular toy and are typically not adjustable to position the toy differently if desired. Some stimulation devices include mounting mechanisms for hands-free support, such as suction cups, for example. However, these typical mounting mechanisms merely secure the sexual stimulation toy in place and do not provide a means for adjusting the position of the stimulation toy. Currently, individuals must purchase many different types of stimulation toys having different supporting devices, which can be time consuming and expensive. Some of these stimulation toys that include motors and other electronic features must be controlled via user support and contact with the toy itself, which can be difficult when the stimulation toy is in use or when it is mounted to a support surface. In order to address these concerns, the present invention provides an adjustable stimulation device that provides users with multiple ways to support and adjust an attached sexual stimulation toy, as well as providing for remote control of the stimulation toy in embodiments where the stimulation toy is motorized.

Devices have been disclosed in the known art that relate to supports for sexual stimulation toys. However, the devices have several drawbacks. Some known art devices provide sexual stimulation toys with handles and other grasping aids. The handles in these types of devices are typically not adjustable and are difficult to control in terms of direction and orientation. Further, most stimulation devices lack the overall adjustability needed to achieve a particular angle or position when using the device.

In light of the devices disclosed in the known art, it is submitted that the present invention substantially diverges in design elements from the prior art and consequently it is clear that there is a need in the art for an improvement to existing stimulation devices. In this regard the present invention substantially fulfills these needs.

SUMMARY OF THE INVENTION

In view of the foregoing disadvantages inherent in the known types of stimulation devices now present in the prior art, the present invention provides an adjustable stimulation device wherein the same can be utilized to adjustably support, position, and control an attached stimulation toy.

The adjustable sexual stimulation device generally includes a telescopically adjustable support arm having a handle affixed to a first end, a connector having a first end removably secured to a second end of the telescopically adjustable support arm, a flexible gooseneck support having a first end removably secured to a second end of the connector, and a stimulation toy removably secured to a second end of the flexible gooseneck support. The flexible gooseneck support is configured to maintain a position to which it is bent, such that it can be adjusted to support the stimulation toy at a desired angle.

In one embodiment, the adjustable sexual stimulation device also includes a removably attached clamp that allows users to support the adjustable sexual stimulation device from a supporting object for hands-free support if desired.

In one embodiment, the removably attached stimulation toy includes a power source operably connected to a control circuit, a motor, and a wireless transceiver, while the handle portion includes a power source operably connected to control buttons, a control circuit, and a wireless transceiver, such that the handle buttons are configured to wirelessly control the motor of the stimulation toy.

Other objects, features, and advantages of the present invention will become apparent given the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
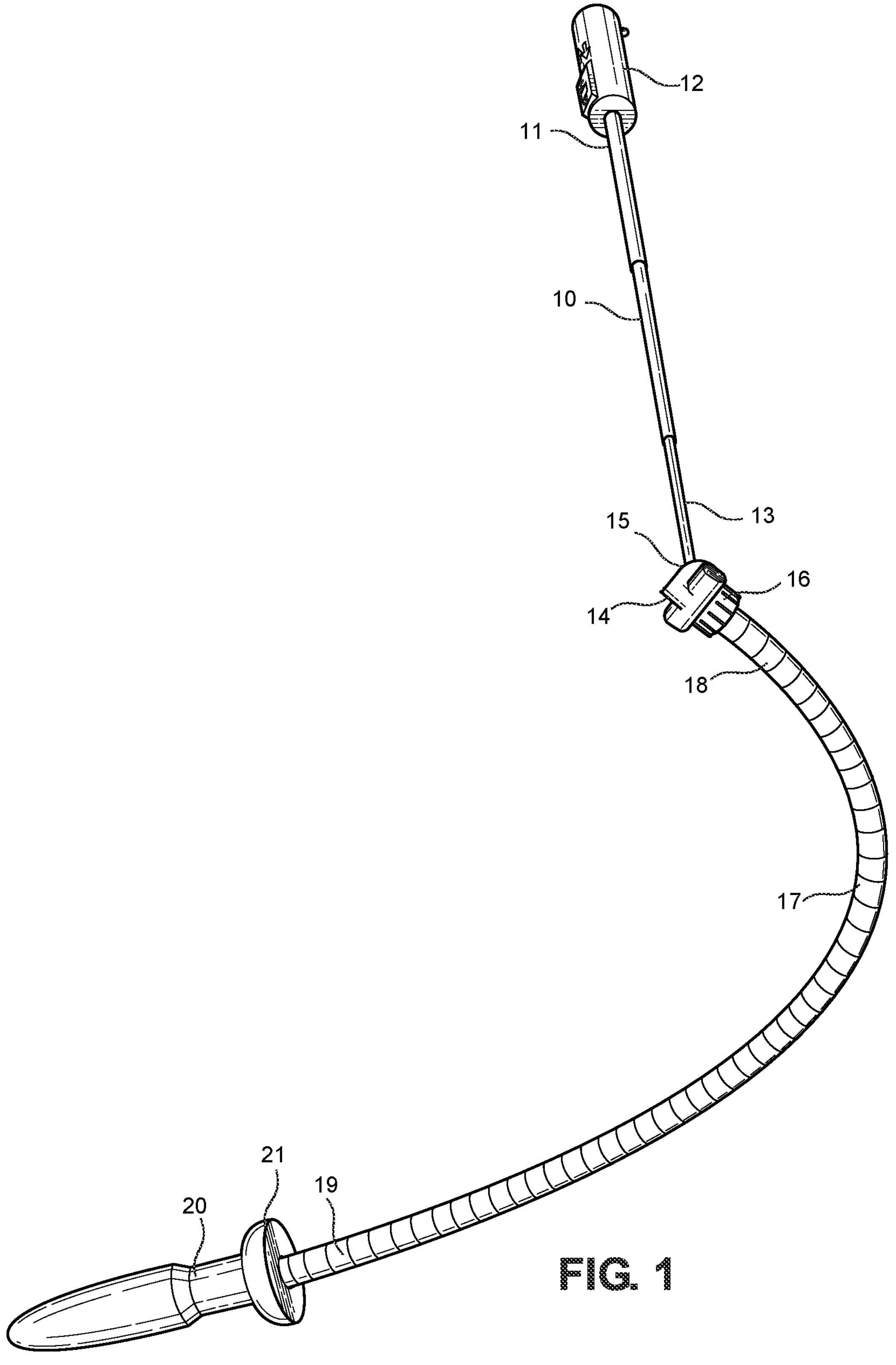
FIG. 1 shows a perspective view of an embodiment of the adjustable stimulation device.

Reference is made herein to the attached drawings. Like reference numerals are used throughout the drawings to depict like or similar elements of the adjustable stimulation device. For the purposes of presenting a brief and clear description of the present invention, the preferred embodiment will be discussed as used for providing an adjustable supporting handle for a stimulation toy, which can also control a motor of the stimulation toy. The figures are intended for representative purposes only and should not be considered to be limiting in any respect.

Referring now to FIG. 1, there is shown a perspective view of an embodiment of the adjustable stimulation device. The adjustable stimulation device includes a telescopically adjustable support arm 10 having a handle 12 affixed to a first end 11. The support arm 10 can adjust in length via extension or retraction of individual nested or telescoping members that form the support arm 10. The support arm 10 can maintain a desired length via a friction fit, ball detent, or other commonly used telescoping support method. The handle 12 provides a grasping area for when a user utilizes the adjustable stimulation device.

A second end 13 of the support arm 10 is connected to a connector 14. In one embodiment, the second end 13 of the support arm 10 is removably secured to the first end 15 of the connector 14, which may be accomplished via friction fit, threading, or other connection means. The disconnecting capabilities allow the user to take the device apart for storage or cleaning and easily reassemble the device as desired.

Figure 2:
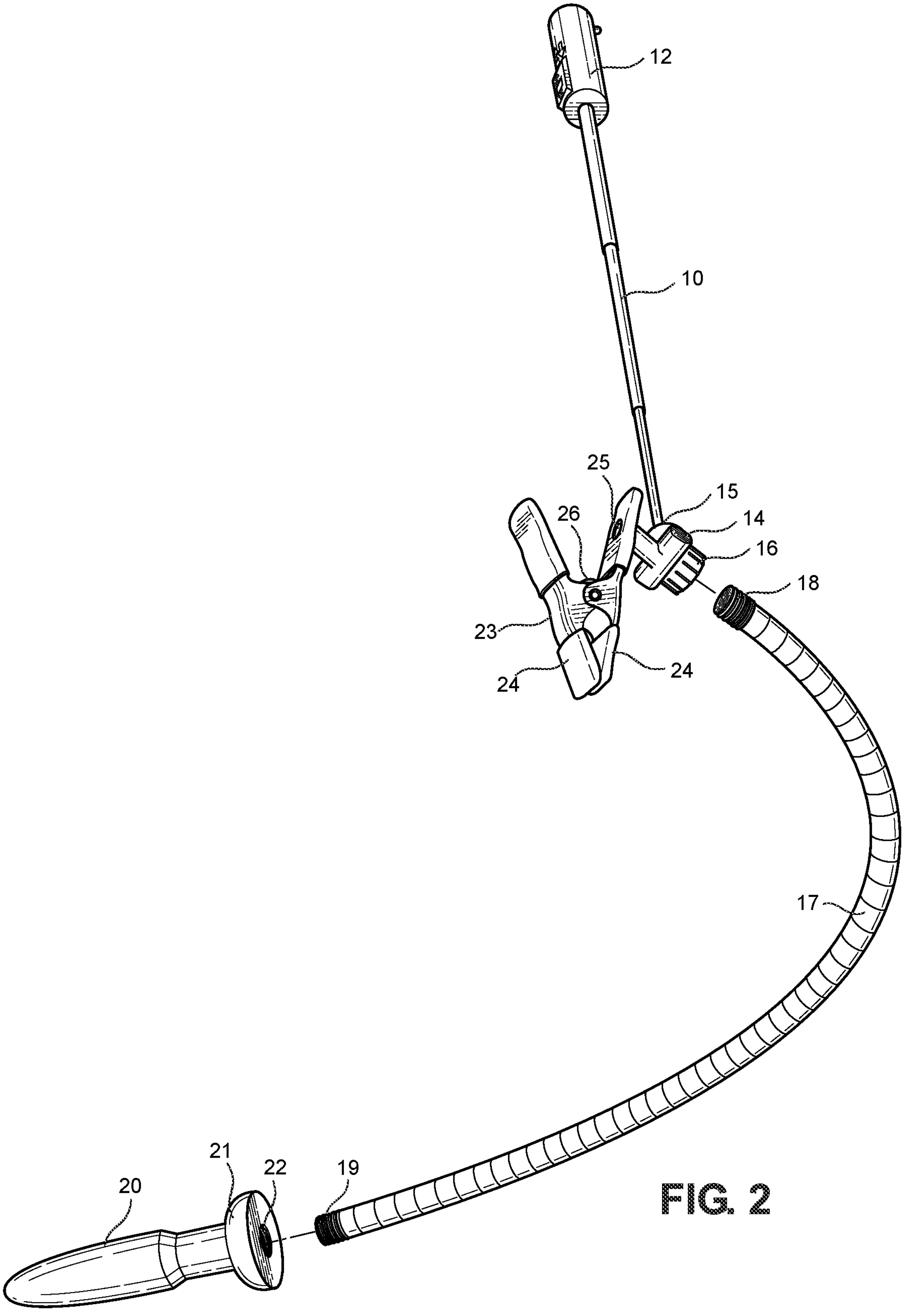
FIG. 2 shows a perspective view of an alternate embodiment of the adjustable stimulation device showing the components separated.

The adjustable stimulation device further includes a flexible gooseneck support 17. The flexible gooseneck support includes a first end 18 removably secured to a second end 16 of the connector 14. As shown in FIG. 2, there may be a threaded connection between the second end 16 of the connector 14 and the first end 18 of the flexible gooseneck support 17. The flexible gooseneck support 17 includes a plurality of interconnected articulated members that make up the support 17. This allows the flexible gooseneck support 17 to maintain a position to which it is bent. A stimulation toy 20 is removably secured at its base portion 21 to a second end 19 of the flexible gooseneck support 17. The flexible gooseneck support can be adjusted to support the stimulation toy 20 at a desired angle. The shown stimulation toy 20 is merely for example purposes, and there is no intent to limit the stimulation toy to any particular shape or size. In other words, the present invention provides for the attachment of many different shapes, sizes, and types of stimulation toys.

In some embodiments, such as the embodiment shown in FIG. 2 for example, the second end 19 of the gooseneck support 17 has threading that engages a threaded opening 22 on the base 21 of the stimulation toy 20. This allows the user to easily change out different stimulation toys 20 as desired. In other embodiments, the second end 19 of the gooseneck support 17 can engage the opening 22 on the base 21 of the stimulation toy 20 via frictional fit.

Referring now to FIG. 2, there is shown a perspective view of an alternate embodiment of the adjustable stimulation device showing the components separated. In some embodiments, the connector 14 includes a clamp 23 having a pair of opposing jaws 24 that are configured to grip an object for mounting the clamp 23 thereto. The clamp 23 may be integral to the connector or may be removably attached thereto to further aid in disassembly for cleaning or storage. For example, there may be a threaded connection between a post 25 on the connector 14 and an opening on one of the clamp jaws 24. The clamp jaws 24 are biased to a closed position via a spring 26. The clamp 23 may be utilized to removably secure the flexible gooseneck 17 and an attached stimulation toy 20 to a supporting object, such as a bed post, as one example. In such configurations, the handle 12 can be retracted via the telescoping support 10 to make it easier to attach the clamp 23 to a supporting object.

Figure 3:
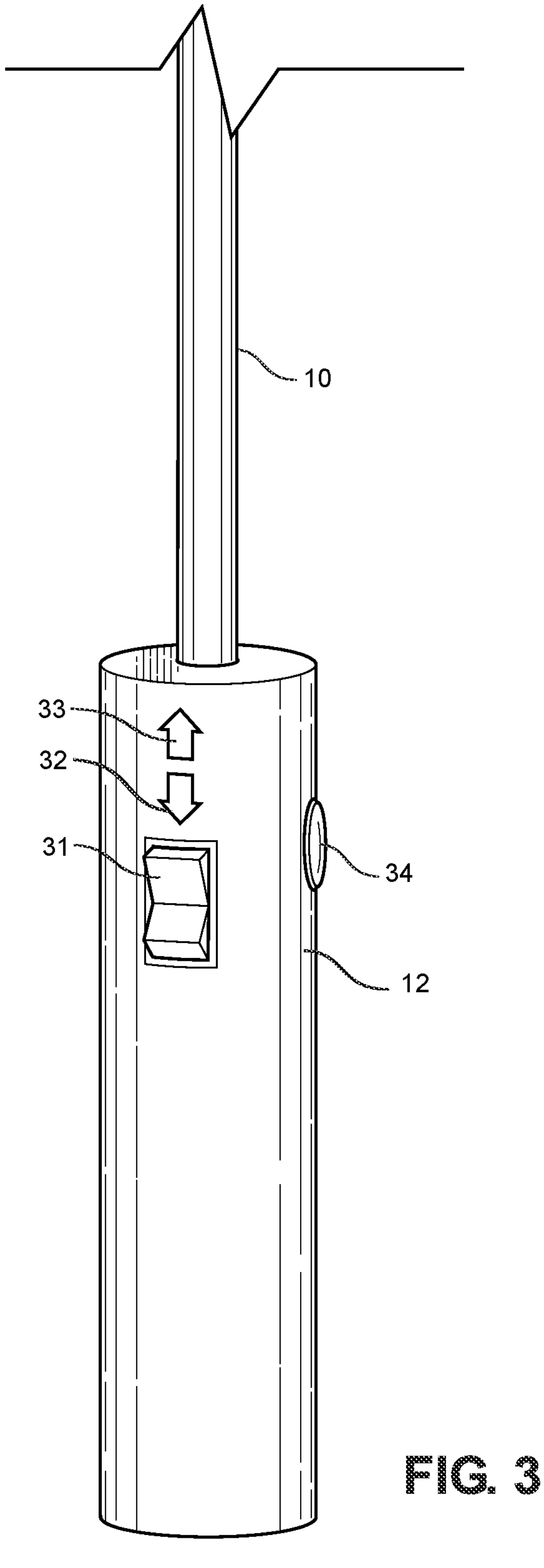
FIG. 3 shows a perspective view of the handle component of an embodiment of the adjustable stimulation device.

Referring now to FIG. 3, there is shown a perspective view of the handle component of an embodiment of the adjustable stimulation device. While the handle can support non-motorized or more simple stimulation toys, in the shown embodiment, the handle 12 includes various controls that can control functions of an attached sexual stimulation toy that has motors such as vibration motors for example. For example, there may be a power button 31 that turns the motor of the stimulation toy on or off. There can also be corresponding controls 32, 33 for raising or lowering the speed of the motor to suit the user's preference. Further, the handle 12 can include an additional button 34 that controls the telescoping action of the support 10.

Figure 4:
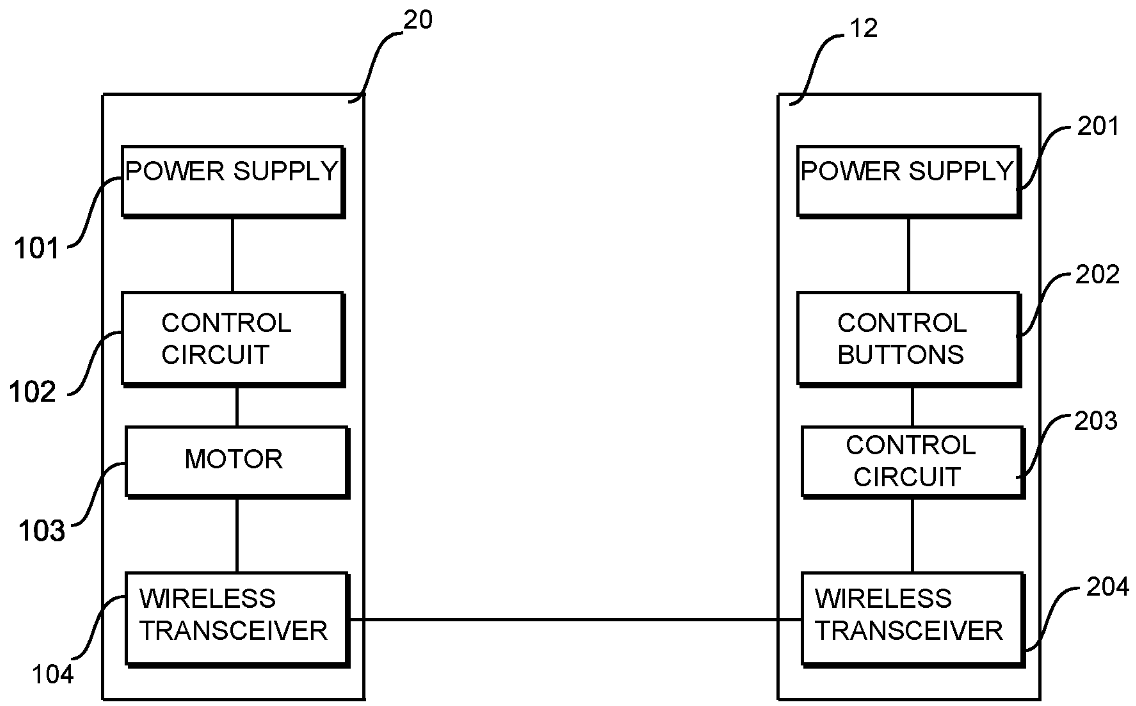
FIG. 4 shows a block diagram of the components of an embodiment of the adjustable stimulation device, wherein the attached stimulation toy includes a motor.

Referring now to FIG. 4, there is shown a block diagram of the components of an embodiment of the adjustable stimulation device, wherein the attached stimulation toy includes a motor. In the shown embodiment, the stimulation toy 20 includes a power supply 101 operably connected to a control circuit 102, a motor 103, and a wireless transceiver 104. The wireless transceiver 104 allows the stimulation toy 20 to be wirelessly controlled via a corresponding wireless transceiver 204 in the handle 12. For example, their may be a Bluetooth connection between the handle control circuit and 203 and the stimulation toy control circuit 102, which can be accomplished via the pair of wireless transceivers 104, 204. Other types of wireless communications protocols may also be utilized. In other embodiments, there may be a wired connection between the handle controls and the stimulation toy 20.

In the shown embodiment, the handle 12 includes a power supply operably connected to the group of control buttons 202, the control circuit 203, and its wireless transceiver 204. When the user activates the control buttons 202, the control circuit 203 causes the wireless transceiver 204 to send a corresponding wireless signal to the wireless transceiver 104 of the stimulation toy 20. The control circuit 102 translates the wireless instructions and operates the motor 103 accordingly. In this way, the adjustable support device can also be utilized to control the motor of the attached stimulation toy, further increasing its overall utility.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable stimulation device, comprising:

a telescopically adjustable support arm having a handle affixed to a first end of the telescopically adjustable support arm;

a connector having a first end removably secured to a second end of the telescopically adjustable support arm;

a clamp integral with the connector and configured to secure the connector to a support object;

a flexible gooseneck support having a first end removably secured to a second end of the connector;

a stimulation toy removably secured to a second end of the flexible gooseneck support;

wherein the flexible gooseneck support is adjusted to support the stimulation toy at a desired angle;

wherein the first end of the connector is removably secured to the second end of the telescopically adjustable support arm via a first threaded connection;

wherein the first end of the flexible gooseneck support is removably secured to the second end of the connector via a second threaded connection;

further comprising a base of the stimulation toy is removably secured to the second end of the flexible gooseneck support via a third threaded connection;

wherein the stimulation toy includes a motor operably connected to a first wireless communications mechanism, which is in wireless communication with and operably connected to a second wireless communications mechanism in the handle, such that the stimulation toy motor is controlled wirelessly via one or more control buttons disposed on the handle;

wherein the clamp integral with the connector is removably attached thereto includes a pair of spring-biased jaws that are biased to a closed position;

wherein the clamp is integral to the connector is removably attached thereto to further aid in disassembly for cleaning or storage; and wherein the clamp jaws are biased to a closed position via a spring.

2. The adjustable stimulation device of claim 1, wherein the base of the stimulation toy is removably secured to the second end of the flexible gooseneck support via a friction fit connection.

3. The adjustable stimulation device of claim 1, wherein the handle includes a control button configured to adjust a length of the telescopically adjustable support arm.

4. The adjustable stimulation device of claim 3, wherein the handle includes one or more adjustment buttons configured to adjust the operational speed of the stimulation toy motor.

* * * * *